United States Patent
Li et al.

(10) Patent No.: US 12,142,246 B2
(45) Date of Patent: Nov. 12, 2024

(54) POWER DEMAND REDUCTION FOR IMAGE GENERATION FOR DISPLAYS

(71) Applicant: QUALCOMM Incorporated, San Diego, CA (US)

(72) Inventors: Yunzhen Li, Shenzhen (CN); Yanshan Wen, Shanghai (CN); Hailong Wang, Shenzhen (CN)

(73) Assignee: QUALCOMM Incorporated, San Diego, CA (US)

(*) Notice: Subject to any disclaimer, the term of this patent is extended or adjusted under 35 U.S.C. 154(b) by 41 days.

(21) Appl. No.: 17/997,198

(22) PCT Filed: Jun. 23, 2020

(86) PCT No.: PCT/CN2020/097588
§ 371 (c)(1),
(2) Date: Oct. 26, 2022

(87) PCT Pub. No.: WO2021/258274
PCT Pub. Date: Dec. 30, 2021

(65) Prior Publication Data
US 2023/0186872 A1    Jun. 15, 2023

(51) Int. Cl.
*G09G 5/36*        (2006.01)
*A63F 13/52*       (2014.01)
(Continued)

(52) U.S. Cl.
CPC .............. *G09G 5/363* (2013.01); *A63F 13/52* (2014.09); *G06F 3/14* (2013.01); *G06T 1/20* (2013.01);
(Continued)

(58) Field of Classification Search
CPC .. G09G 5/363; G09G 5/399; G09G 2330/021; G09G 2320/0252;
(Continued)

(56) References Cited

U.S. PATENT DOCUMENTS 6,128,026 A * 10/2000 Brothers, III .......... G09G 5/399
                                                345/503
2009/0141033 A1* 6/2009 Street .................... G06T 15/005
                                                345/506
(Continued)

FOREIGN PATENT DOCUMENTS

CN    102648483 A    8/2012
CN    103401941 A    11/2013
(Continued)

OTHER PUBLICATIONS

Supplementary European Search Report for European Patent Application No. 20942131.2, mailed Dec. 18, 2023, 11 pages.
(Continued)

*Primary Examiner* — Prabodh M Dharia
(74) *Attorney, Agent, or Firm* — QUALCOMM Incorporated

(57) ABSTRACT

Power demand reduction for image generation for displays skips rendering of frames that are highly similar based on a comparison of certain parameters associated with draw calls. A first set of draw calls is received from a game engine by a central processing unit (CPU) circuit and then a second set of draw calls are provided to the CPU circuit. The CPU circuit compares the second set of draw calls to the first set of draw calls. If there is a change in at least one parameter that exceeds a threshold, then the CPU circuit sends the second set of draw calls to a graphics processing unit (GPU) circuit for rendering. If, however, the change in selected parameters is below the threshold, then the CPU circuit sends an earlier rendered image to the display for presentation to the user, effectively omitting usage of the GPU circuit for that frame.

24 Claims, 9 Drawing Sheets

(51) Int. Cl.
*G06F 3/14* (2006.01)
*G06T 1/20* (2006.01)
*G06V 10/74* (2022.01)

(52) U.S. Cl.
CPC ..... *G06V 10/761* (2022.01); *G09G 2330/021* (2013.01); *G09G 2360/08* (2013.01)

(58) Field of Classification Search
CPC ......... G09G 2320/103; G09G 2340/16; G09G 2360/16; G09G 2360/18; G09G 2360/06; G09G 2360/08; A63F 13/52; G06F 3/14; G06T 1/20; G06V 10/761
USPC .......................... 345/503, 506, 520, 522, 582
See application file for complete search history.

(56) References Cited

U.S. PATENT DOCUMENTS

| | | | |
|---|---|---|---|
| 2011/0157202 A1 | 6/2011 | Kwa et al. | |
| 2015/0130821 A1* | 5/2015 | Shah | G06F 3/14 345/520 |
| 2016/0104264 A1* | 4/2016 | Arulesan | G06T 15/04 345/582 |
| 2016/0364829 A1* | 12/2016 | Apodaca | G06F 9/38 |
| 2016/0379332 A1 | 12/2016 | Krutsch et al. | |
| 2017/0262955 A1 | 9/2017 | Lin et al. | |
| 2018/0081429 A1* | 3/2018 | Akenine-Moller | G06F 3/013 |
| 2018/0374189 A1 | 12/2018 | Marchya et al. | |
| 2019/0206111 A1* | 7/2019 | Yadav | G06F 9/5044 |

FOREIGN PATENT DOCUMENTS

| | | |
|---|---|---|
| CN | 104375796 A | 2/2015 |
| CN | 108765531 A | 11/2018 |
| CN | 110520819 A | 11/2019 |
| EP | 2508986 A1 | 10/2012 |
| WO | 2019135910 | 7/2019 |
| WO | 2019228497 A1 | 12/2019 |

OTHER PUBLICATIONS

International Search Report and Written Opinion—PCT/CN2020/097588—ISA/EPO—Jan. 26, 2021.

* cited by examiner

POWER DEMAND REDUCTION FOR IMAGE GENERATION FOR DISPLAYS

PRIORITY APPLICATION

The present application is a national stage application under 35 U.S.C. 371 of International Patent Application Serial No. PCT/CN2020/097588, filed Jun. 23, 2020 and entitled "POWER DEMAND REDUCTION FOR IMAGE GENERATION FOR DISPLAYS," which is incorporated herein by reference in its entirety.

BACKGROUND

I. Field of the Disclosure

The technology of the disclosure relates generally to displays on mobile devices, and more particularly to managing image processing for displays on mobile devices.

II. Background

Computing devices have many functions, but one popular function is to play games. Many games provide a visual image on a display of the computing device. In some games this image may be relatively static, with only minor changes as a game piece or avatar is manipulated. In others, the image may be relatively dynamic, with extensive changes in the image composition as camera angle, landscape, or game piece manipulation occurs. The advent of mobile computing devices has seen many games made for or adapted to such mobile computing devices. Mobile computing devices have a constraint not present for desktop or traditional console type computing devices in the form of a battery. Heavy image manipulation may deplete the battery of a mobile computing device rapidly, and there is interest in making such image manipulation less power intensive.

SUMMARY OF THE DISCLOSURE

Aspects disclosed in the detailed description include systems and methods for power demand reduction for image generation for displays. Exemplary aspects are particularly appropriate for reducing power demands for image generation for displays associated with mobile computing devices that may be providing images from a game, but the teachings of the present disclosure are not so limited. In particular, power demand for image generation may be reduced by skipping rendering of frames that are highly similar based on a comparison of certain parameters associated with draw calls (e.g., a command containing information telling a graphics processing unit (GPU) circuit about textures, states, shades, rendering objects, buffers) for the frames. In an exemplary aspect, a first set of draw calls is received from a game engine by a central processing unit (CPU) circuit. The CPU circuit sends the first set of draw calls associated with a first frame to a GPU circuit, where the first set of draw calls is rendered, and an image is sent from the GPU circuit to the CPU circuit. The CPU circuit then sends the rendered image to the display for visual viewing by or perception by the user. Meanwhile, the game engine generates a second set of draw calls associated with a second frame. The second set of draw calls is provided to the CPU circuit. The CPU circuit compares the second set of draw calls to the first set of draw calls to see how much change exists between the two sets of draw calls. If the change in at least one parameter exceeds a threshold, then the CPU circuit sends the second set of draw calls to the GPU circuit for rendering. If, however, the change in selected parameters is below the threshold, then the CPU circuit sends the earlier rendered image to the display for presentation to the user, effectively omitting usage of the GPU circuit for that frame. Reduction in usage of the GPU circuit allows for power savings.

In this regard in one aspect, a device is disclosed. The device includes a processor. The processor includes a display-bus interface configured to couple to a display bus. The processor also includes a front-frame buffer communicatively coupled to the display-bus interface. The processor also includes a back-frame buffer communicatively coupled to the front-frame buffer. The processor also includes an instruction-processing circuit communicatively coupled to the front-frame buffer and the back-frame buffer. The processor also includes a GPU interface coupled to the instruction-processing circuit and configured to send draw calls to a GPU circuit based on rendering commands generated by the instruction-processing circuit. The instruction-processing circuit is also configured to control the front-frame buffer and the back-frame buffer and move data therebetween. The instruction-processing circuit is also configured to compare a second set of draw calls received from a game engine software to a first set of draw calls previously received from the game engine software to determine a difference. The instruction-processing circuit is also configured to, in response to the difference not exceeding a predefined threshold, send a previous frame image based on the first set of draw calls to a display through the display-bus interface.

In another aspect, a method of controlling a processor is disclosed. The method includes receiving a first set of draw calls from a game engine software. The method also includes subsequently receiving a second set of draw calls from the game engine software. The method also includes sending the first set of draw calls to a GPU circuit. The method also includes not sending the second set of draw calls to the GPU circuit when a difference between the first set of draw calls and the second set of draw calls is less than a predefined threshold.

DETAILED DESCRIPTION

Figure 1:
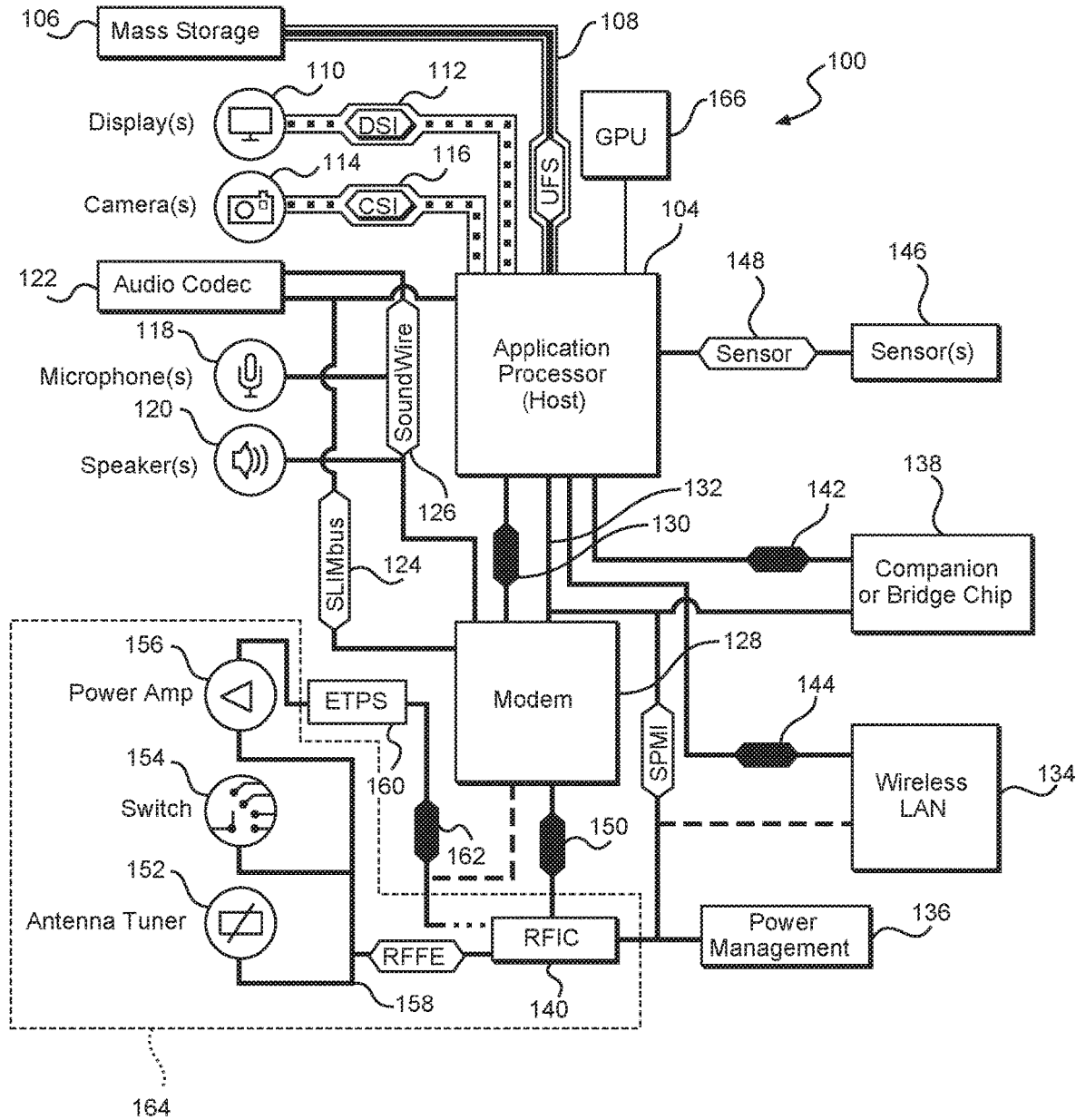
FIG. 1 is a block diagram of an exemplary mobile computing device that may have a display and is capable of running games thereon and may include the power saving techniques of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for power demand reduction for image generation for displays. Exemplary aspects are particularly appropriate for reducing power demands for image generation for displays associated with mobile computing devices that may be providing images from a game, but the teachings of the present disclosure are not so limited. In particular, power demand for image generation may be reduced by skipping rendering of frames that are highly similar based on a comparison of certain parameters associated with draw calls (e.g., a command containing information telling a graphics processing unit (GPU) circuit about textures, states, shades, rendering objects, buffers) for the frames. In an exemplary aspect, a first set of draw calls is received from a game engine by a central processing unit (CPU) circuit. The CPU circuit sends the first set of draw calls associated with a first frame to a GPU circuit, where the first set of draw calls is rendered, and an image is sent from the GPU circuit to the CPU circuit. The CPU circuit then sends the rendered image to the display for visual viewing by or perception by the user. Meanwhile, the game engine generates a second set of draw calls associated with a second frame. The second set of draw calls is provided to the CPU circuit. The CPU circuit compares the second set of draw calls to the first set of draw calls to see how much change exists between the two sets of draw calls. If the change in at least one parameter exceeds a threshold, then the CPU circuit sends the second set of draw calls to the GPU circuit for rendering. If, however, the change in selected parameters is below the threshold, then the CPU circuit sends the earlier rendered image to the display for presentation to the user, effectively omitting usage of the GPU circuit for that frame. Reduction in usage of the GPU circuit allows for power savings.

In this regard, FIG. 1 is a block diagram of a mobile computing device 100 such as a smart phone, mobile computing device tablet, or the like. While exemplary aspects of the present disclosure are particularly well suited for mobile computing devices having games thereon, it should be appreciated that the present disclosure is not so limited and may be useful in any computing system having a display for which power savings may be desirable.

With continued reference to FIG. 1, the mobile computing device 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUND-WIRE bus 126. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a local area network (LAN or WLAN) IC (LAN IC or WLAN IC) 134, a power management integrated circuit (PMIC) 136, a companion IC (sometimes referred to as a bridge chip) 138, and a radio frequency IC (RFIC) 140. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through a radio frequency front end (RFFE) bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated).

With continued reference to FIG. 1, the application processor 104 may further include a GPU circuit as a processing core therewithin, or a separate GPU circuit 166 may be provided in the mobile computing device 100. The GPU circuit 166 may be coupled to the application processor 104 through any appropriate bus. More detail about these two possible variations is provided below with reference to FIGS. 2A and 2B, respectively.

While exemplary aspects of the present disclosure are well suited for use on a mobile computing device 100, they may also be used on automobile displays, desktop computers, or the like where a GPU circuit is used to render frames for presentation on a display.

Figure 2A:
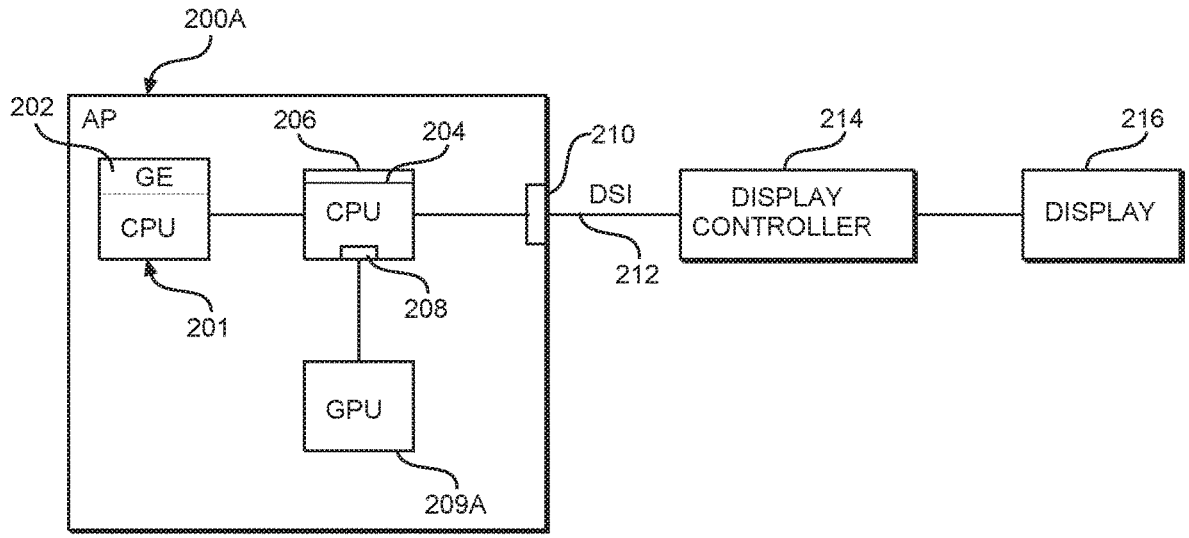
FIG. 2A is a block diagram of an application processor having multiple central processing unit (CPU) circuits and an external graphics processing unit (GPU) circuit that may implement exemplary aspects of the present disclosure.
Figure 2B:
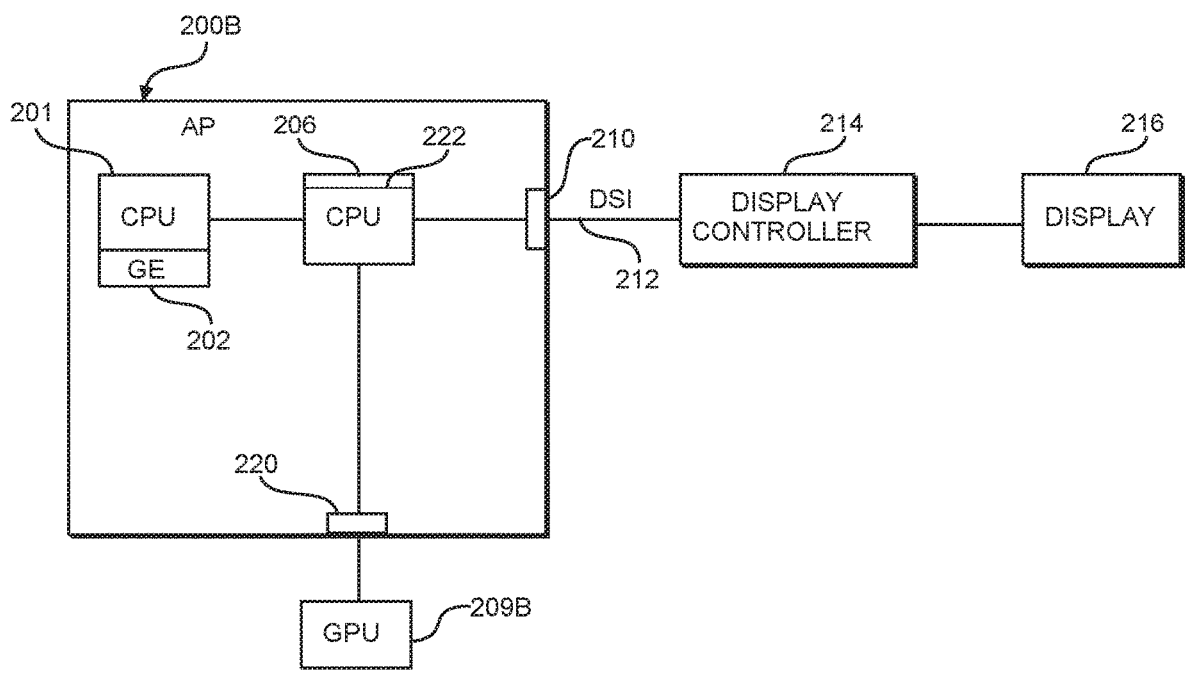
FIG. 2B is a block diagram of an application processor having multiple CPU circuits with an internal GPU circuit that may implement exemplary aspects of the present disclosure.

As noted above, the GPU circuit may be within an application processor or external to an application processor. These two possibilities are illustrated in FIGS. 2A and 2B, respectively. In this regard, FIG. 2A illustrates an application processor 200A (which may correspond to the application processor 104 of FIG. 1) with a first processing core or instruction-processing circuit 201 (also referred to as a central processing unit (CPU) circuit in the drawings) that may have game engine (GE) software 202 operating thereon. The GE software 202 need not specifically be a video game, but equivalently could be any software that generates images for perception by an end user (e.g., drawing software, video editing software, computer aided design (CAD) software, or the like). The GE software 202 generates draw calls, which are commands containing information telling a GPU circuit about textures, states, shades, rendering objects, buffers, and the like. In general, depending on the nature of the image being created, between two hundred and four hundred draw calls are made for each frame. Typical frame rates are between fifty and ninety frames per second (FPS), with sixty being a generally accepted norm (in part because many monitors or displays are made to operate at 60 hertz (Hz), and thus, no matter how any FPS the game is capable of producing, the display will still only operate at 60 Hz).

With continued reference to FIG. 2A, the application processor 200A may further include a second instruction-processing circuit 204 (also referred to as a CPU circuit in FIG. 2A), which receives the draw calls from the first instruction-processing circuit 201. In particular, graphics driver software 206 operating on the second instruction-processing circuit 204 may receive the draw calls from the GE software 202. The application processor 104A may include a GPU interface 208 (in this case the GPU interface 208 may be coupled to (where "coupled to" includes being integrated into) the second instruction-processing circuit 204), which may be configured to send the draw calls from the second instruction-processing circuit 204 to a GPU circuit 209A (which may correspond to the GPU circuit 166 of FIG. 1) within the application processor 200A. Further, a rendered frame may be received by the second instruction-processing circuit 204 through the GPU interface 208 from the GPU circuit 209A. The application processor 200A may further include a display-bus interface 210 configured to couple to a display bus 212 (which may correspond to the DSI bus 112 of FIG. 1). The display bus 212 may be the medium through which a rendered frame is provided to a display controller 214 for presentation on a display 216.

While FIG. 2A illustrates the GPU circuit 209A inside the application processor 200A, the GPU circuit may be external to the application processor as better illustrated in FIG. 2B. In particular, an application processor 200B is substantially similar to the application processor 200A and may include the first instruction-processing circuit 201, with associated GE software 202, and the display-bus interface 210 coupled to the display bus 212, which in turn is coupled to the display controller 214. As with FIG. 2A, the display controller 214 controls the display 216. However, as noted, in FIG. 2B, a GPU circuit 209B is positioned outside the application processor 200B and is coupled to the application processor 200B by a GPU interface 220. While the circuitry of the GPU circuit 209B may be functionally the same as the GPU circuit 209A, to denote its different location, the designation 209B is used. The GPU interface 220 is coupled to a second instruction-processing circuit 222. The second instruction-processing circuit 222 differs from the second instruction-processing circuit 204 by virtue of the presence of the GPU interface 220, but is otherwise substantially the same as the second instruction-processing circuit 204.

Figure 3:
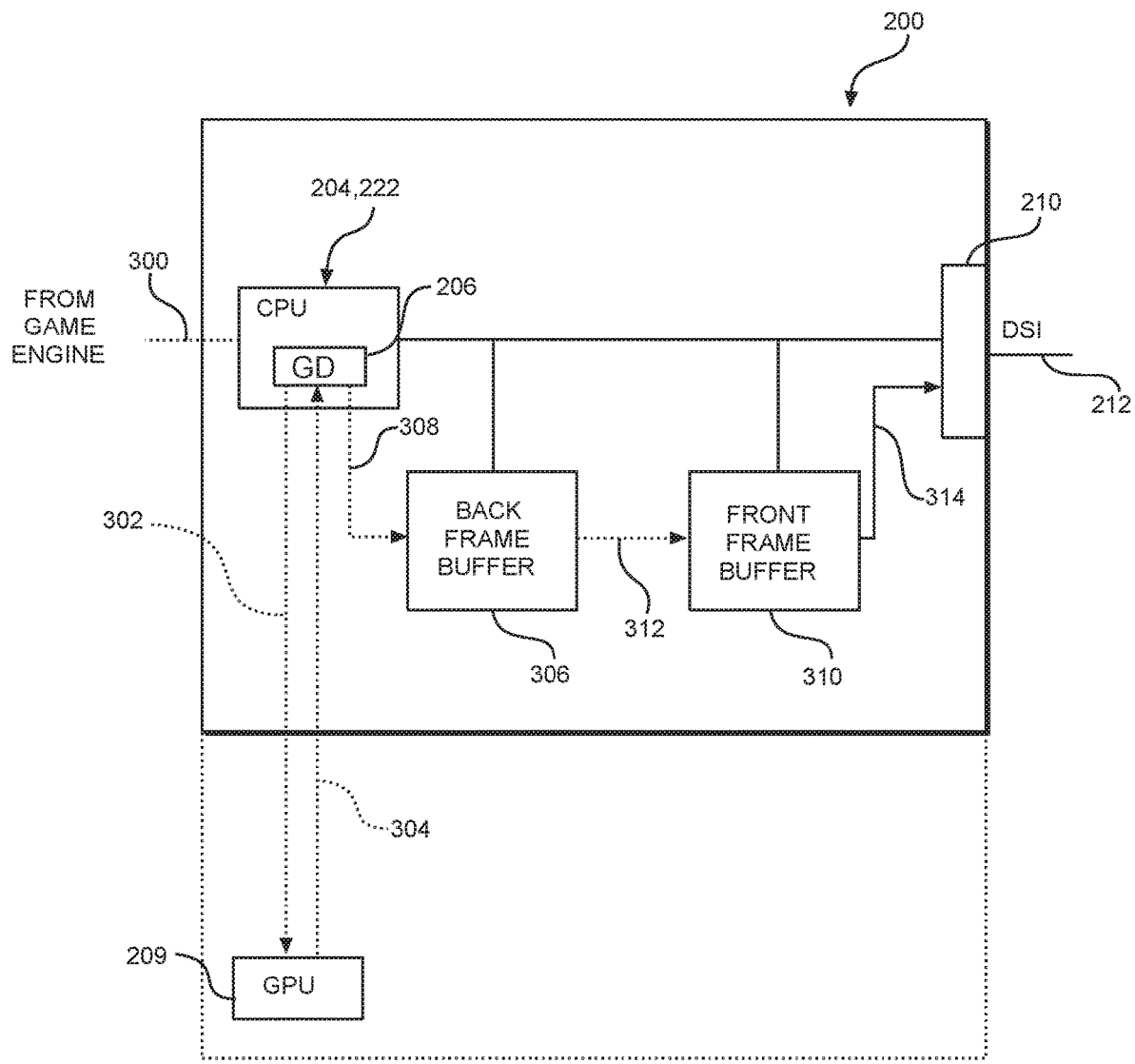
FIG. 3 is a block diagram of an application processor with drawing commands generated by one of the CPU circuits processed by other circuits in (or associated with) the application processor.

For a better understanding of how exemplary aspects of the present disclosure may be implemented, a more detailed view of an application processor 200 is provided in FIG. 3. It should be appreciated that the application processor 200 of FIG. 3 may be either an application processor 200A or 200B. As described above, for each frame, the draw calls from the GE software 202 may be received by a second instruction-processing circuit 204 or 222, and in particular are received by the graphics driver software 206 (generally denoted by line 300). The graphics driver software 206 interacts with the GPU circuit 209 to finish the draw calls (generally denoted by line 302) and gets a rendering result (generally denoted by line 304). The graphics driver software 206 stores the rendering result in a back-frame buffer 306 (generally denoted by line 308). The contents of the back-frame buffer 306 are swapped with contents of a front-frame buffer 310 (generally denoted by line 312). That is, the second instruction-processing circuit 204, 222 controls the front-frame buffer 310 and the back-frame buffer 306 and moves data therebetween.

The contents of the front-frame buffer 310 are then submitted to the display controller 214 through the display-bus interface 210 (generally denoted by line 314).

Figure 4:
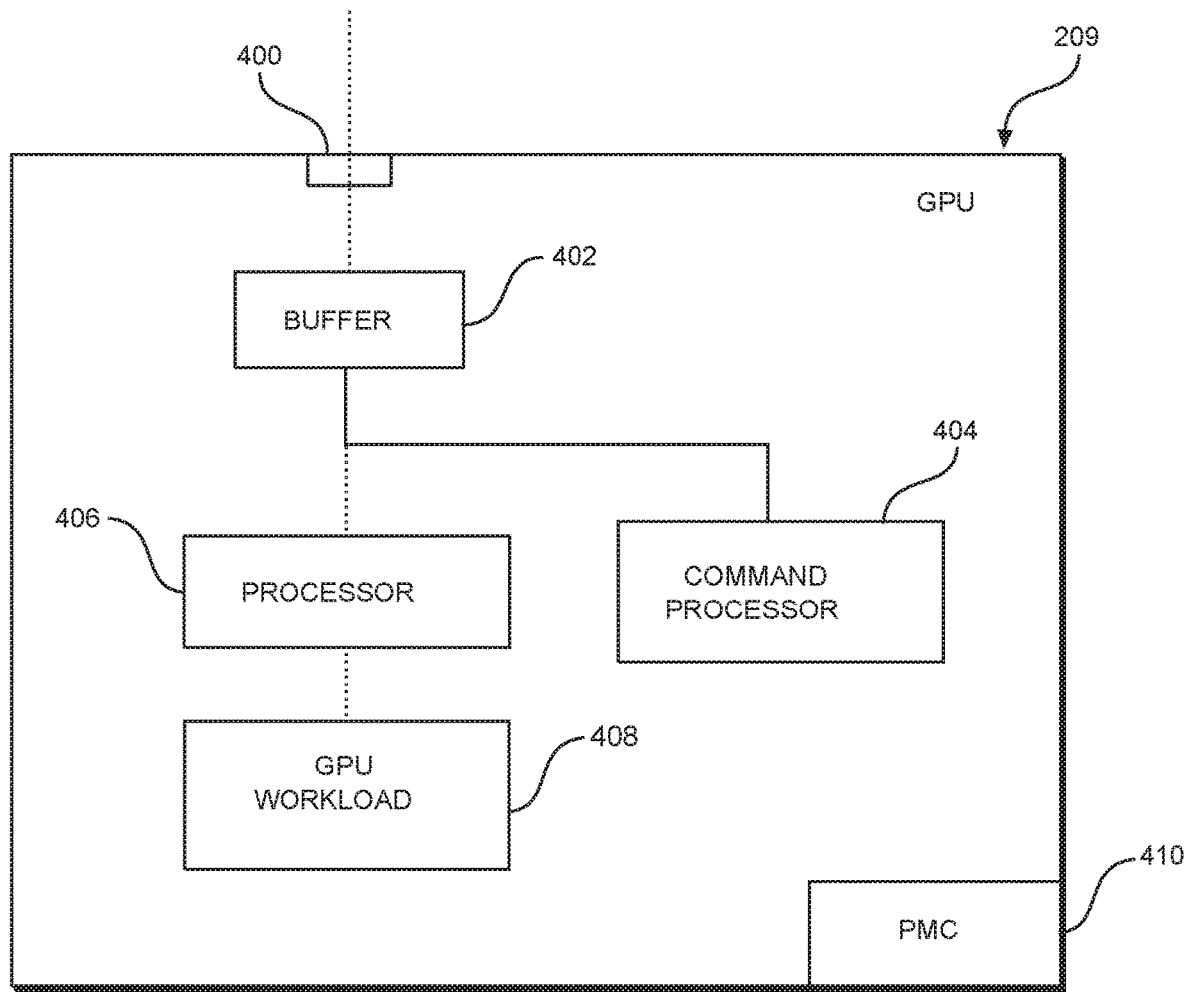
FIG. 4 is a block diagram of a GPU circuit that may receive draw calls from a CPU circuit and render a drawing according to exemplary aspects of the present disclosure.

While not central to the present disclosure, a more detailed illustration of the GPU circuit 209 is provided with reference to FIG. 4. In particular, the GPU circuit may include an interface 400 configured to receive draw calls from the second instruction-processing circuit 204, 222 and send rendered frames thereto. A buffer 402 may store incoming draw calls until a command processor 404 instructs a processor 406 to operate thereon. Responsive to such command, the processor 406 takes the draw calls into a GPU workload 408 and renders a frame. The rendered frame is then sent to the second instruction-processing circuit 204, 222. A power management circuit (PMC) 410 may control power consumption within the GPU circuit 166 as is well understood.

When the GE software 202 generates sixty FPS, the second instruction-processing circuit 204 and the GPU circuit 209A (or the second instruction-processing circuit 222 and the GPU circuit 209B) must also operate at sixty FPS. When the content of the frame is relatively static, this may result in highly duplicative computations being made by the GPU circuit 209A or the GPU circuit 209B. Such computations still require power and may contribute to an accelerated draining of the battery of the mobile computing device 100.

Figure 5:
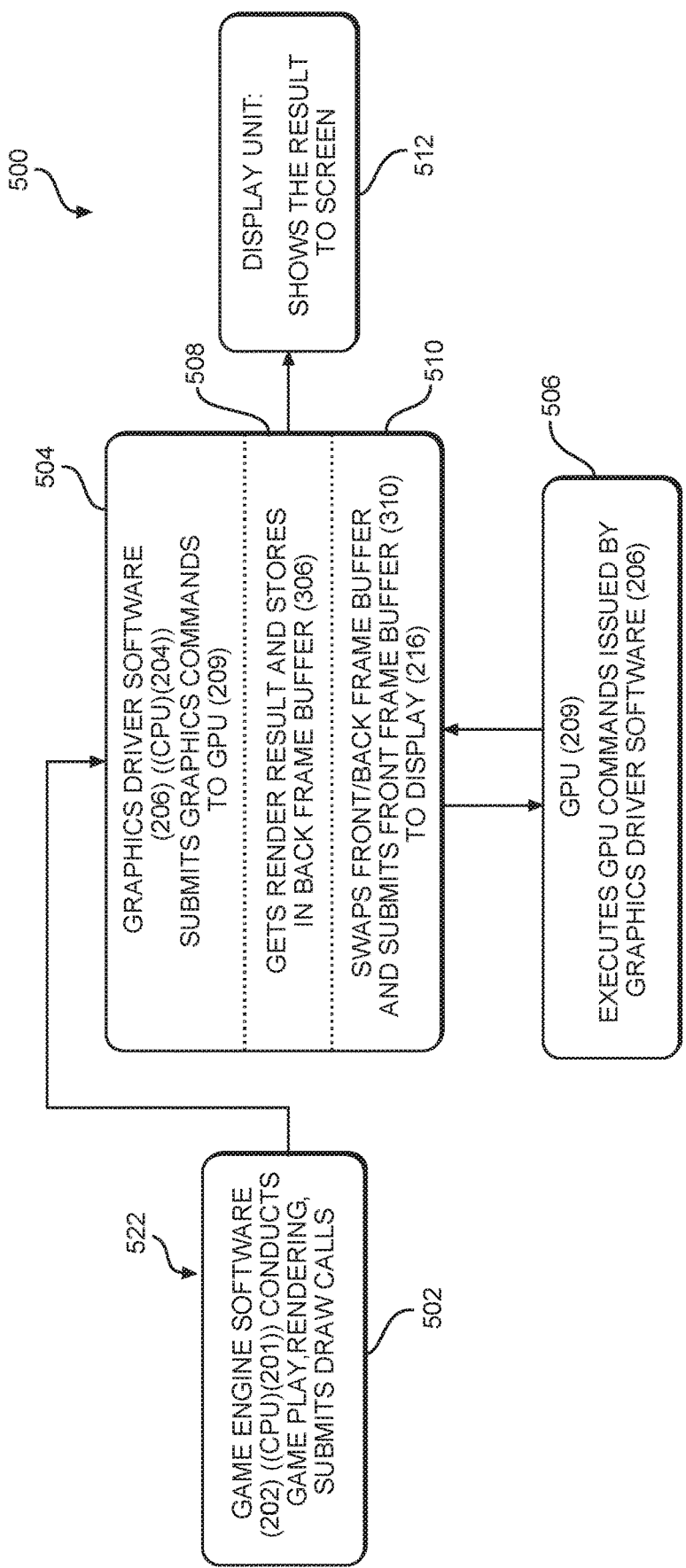
FIG. 5 is a flowchart illustrating a conventional process for rendering frames with a GPU circuit.

A conventional process 500 illustrating this use of the GPU circuit 209 is provided with reference to FIG. 5. In particular, GE software 202 operating on a first instruction-processing circuit 201 conducts game play and generates rendering commands in the form of draw calls, which are submitted to the second instruction-processing circuit 204, 222 (block 502). The graphics driver software 206 of the second instruction-processing circuit 204 submits the graphics commands to the GPU circuit 209 (block 504). The GPU circuit 209 executes GPU commands issued by the graphics driver software 206 (block 506). The second instruction-processing circuit 204, 222 gets the render results back from the GPU circuit 209 and stores the results in the back-frame buffer 306 (block 508). The second instruction-processing circuit 204, 222 then swaps the front-frame buffer 310 with the back-frame buffer 306 and submits the front-frame buffer 310 to the display 216 (block 510). The display 216 then shows the results on a screen so that a user may perceive the game (block 512).

Exemplary aspects of the present disclosure contemplate checking to see how similar different frames are, and, if the frames are sufficiently similar, a new computation by the GPU circuit is skipped. Each such skip decreases the power consumption and may contribute to longer times between recharging of the battery.

Figure 6:
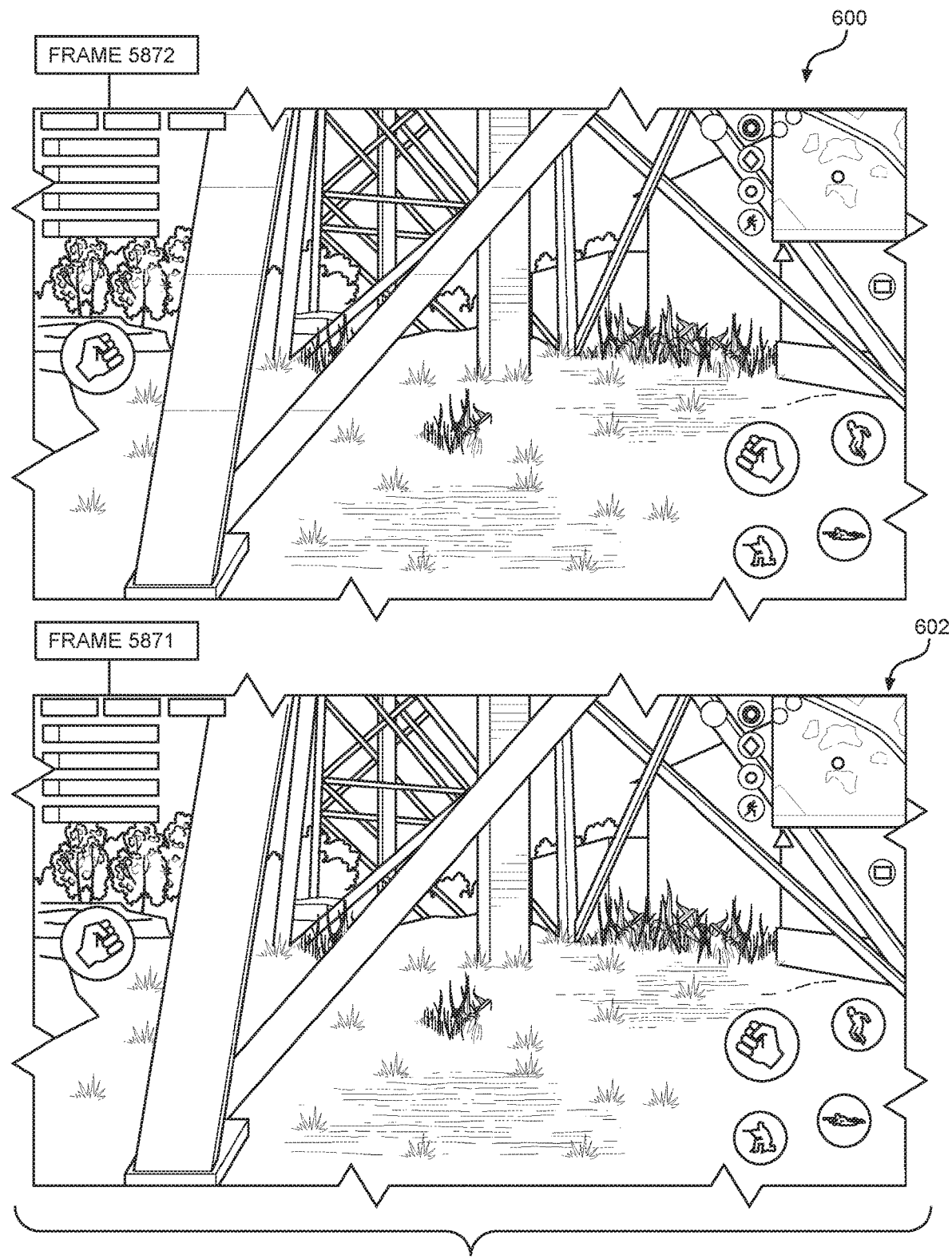
FIG. 6 is a rendering of two sequential frames showing similarities of which advantage may be taken according to power saving techniques of the present disclosure.

For example, FIG. 6 illustrates two exemplary frames 600 and 602, which are temporally adjacent to one another as generated by the GE software 202. Casual visual inspection reveals that the frames 600 and 602 are virtually identical. Accordingly, exemplary aspects of the present disclosure would cause the rendering of the second frame 602 to be skipped to save the power that would otherwise be consumed by the GPU circuit 166 in rendering the draw calls for the second frame 602. The details for determining if frames are sufficiently similar are provided below with reference to FIGS. 7A and 7B.

Figure 7A:
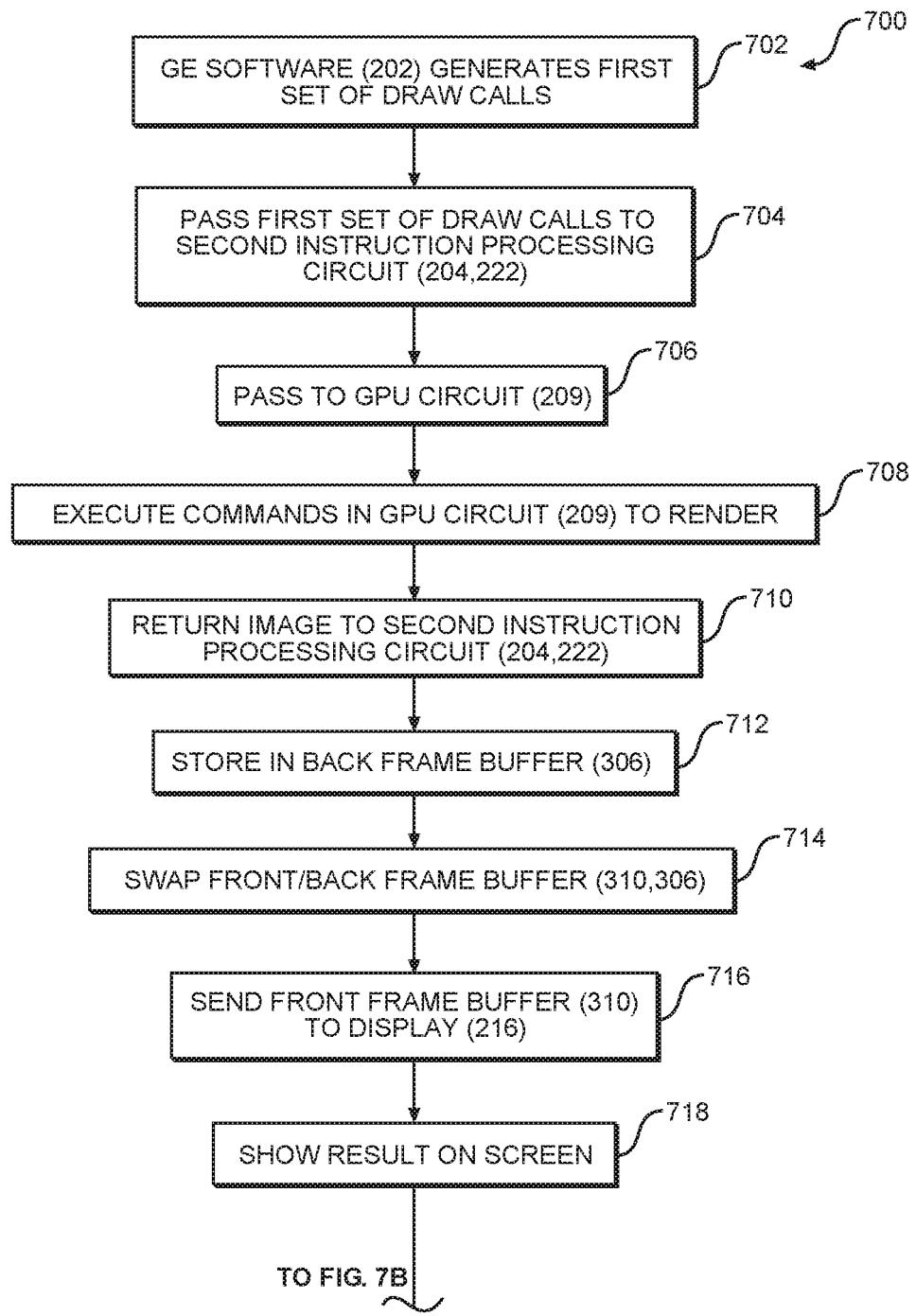
FIGS. 7A and 7B are a flowchart illustrating skipping frame rendering to save power according to exemplary aspects of the present disclosure.
Figure 7B:
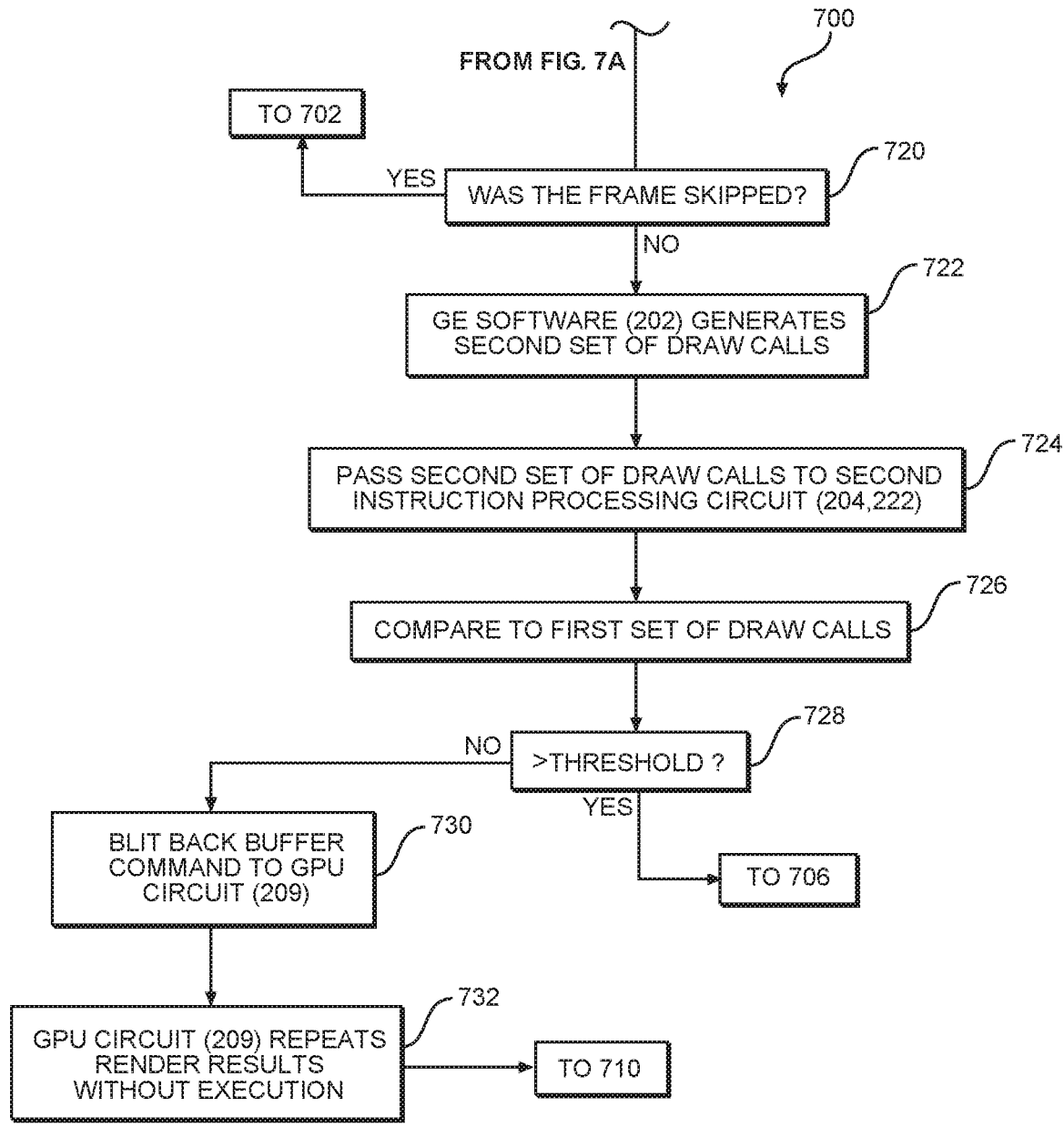

Thus, a process 700 is illustrated in FIG. 7A and continuing on to FIG. 7B that allows for skipping rendering of similar frames to reduce power consumption. In this regard, the process 700 begins with the GE software 202 generating a first set of draw calls (block 702). The GE software 202 passes the first set of draw calls to the second instruction-processing circuit 204, 222 (block 704). The second instruction-processing circuit 204, 222 passes the draw calls to the GPU circuit 209 (block 706). The GPU circuit 209 executes the commands of the draw calls to render a first frame (block 708). The GPU circuit 209 returns the image of the rendered first frame to the second instruction-processing circuit 204, 222 (block 710). The rendered frame is stored in the back-frame buffer 306 (block 712). The second instruction-processing circuit 204, 222 swaps the contents of the front-frame buffer 310 and the back-frame buffer 306 (block 714). The second instruction-processing circuit 204, 222 sends the contents of the front-frame buffer 310 to the display 216 (block 716), which shows the result on the screen (block 718). Up until this point, the process 700 is conventional.

However, exemplary aspects of the present disclosure provide for skipping the rendering of frames that are sufficiently similar to an immediately previously occurring frame. In this regard, as illustrated in FIG. 7B, the second instruction-processing circuit 204, 222 determines if the last frame was skipped (block 720). Note that in an exemplary aspect, it may be if any of the last three (or other specific number) frames was skipped. By performing this check, the second instruction-processing circuit 204, 222 guarantees that a new frame will be rendered at least as frequently as the test is failed. The higher the specific number, the less frequently a skip will be performed. The precise number chosen may depend on the nature of the game. Highly dynamic games may have a relatively high number, while generally static games may be set to two so that every other frame may be skipped in theory. In still another exemplary aspect, a counter may be added in addition to the check so that two or more frames may be skipped consecutively. However, for the typical 60 FPS game, skipping more than every other frame may result in choppy or disjointed visual effects. At higher FPS, skipping more frequently may not cause appreciable degradation.

If the answer to block 720 is yes, then the process 700 returns to block 702, treating the incoming draw calls as a first set of draw calls. If, however, the answer to block 720 is no, there has not been a sufficiently recent skip (e.g., the last frame, last two frames, or last x frames have not been skipped) then the process 700 continues with the GE software 202 generating a second set of draw calls (block 722). As before, the second set of draw calls is passed to the second instruction-processing circuit 204, 222 (block 724). The second instruction-processing circuit 204, 222 compares the second set of draw calls to the first set of draw calls (block 726) and determines if the difference between the two sets of draw calls is greater than some threshold (block 728). The threshold may be a predefined threshold and is explained in greater detail below.

With continued reference to FIG. 7B, if the answer to block 728 is that the difference is greater than the threshold, then the process 700 returns to block 706 in FIG. 7A. If, however, the answer to block 728 is no, then the difference is not greater than a threshold, the process 700 continues by blitting the back buffer commands to the GPU circuit 209 (block 730). The GPU circuit 209 then repeats the render results without execution (block 732) and returns the image to the second instruction-processing circuit 204, 222 resuming the process 700 at block 710. Thus, the second instruction-processing circuit 204, 222 sends the previous frame based on the first set of draw calls to a display through the display-bus interface.

While the term "blit" has been in use within the computer industry for some time, for the sake of clarity, as used herein, to "blit" means to copy bits from one part of a computer's graphical memory to another part. This technique deals directly with the pixels of an image, and draws them directly to the screen, which makes it a fast rendering technique.

The threshold of block 728 may be relative to one or more parameters of the draw calls. Exemplary parameters include, but are not limited to, a number of draws in a frame, a number of vertices in a frame, a number of textured vertices in a frame, a flush count, a camera pose, and a frame buffer object (FBO) pattern including an FBO name, an FBO size, and an FBO sequence. In an exemplary aspect, the threshold test is whether the first set of draw calls is identical to the second set of draw calls. That is, any difference is greater than the threshold. In another exemplary aspect, the threshold test is whether one specific parameter is identical and the remaining parameters are within a tolerance (e.g., 5%). Still other threshold tests may vary the number of parameters that must be identical relative to the number that permits variation. Still other threshold tests may vary the amount of tolerance between different parameters. For example, the number of vertices may vary by 10%, but the number of draws may vary by 5% and the camera pose must be identical. It should be appreciated that the threshold test may be varied for different games, different platforms, different FPS, or the like as needed to help provide a smooth user experience.

The systems and methods for power demand reduction for image generation for displays according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
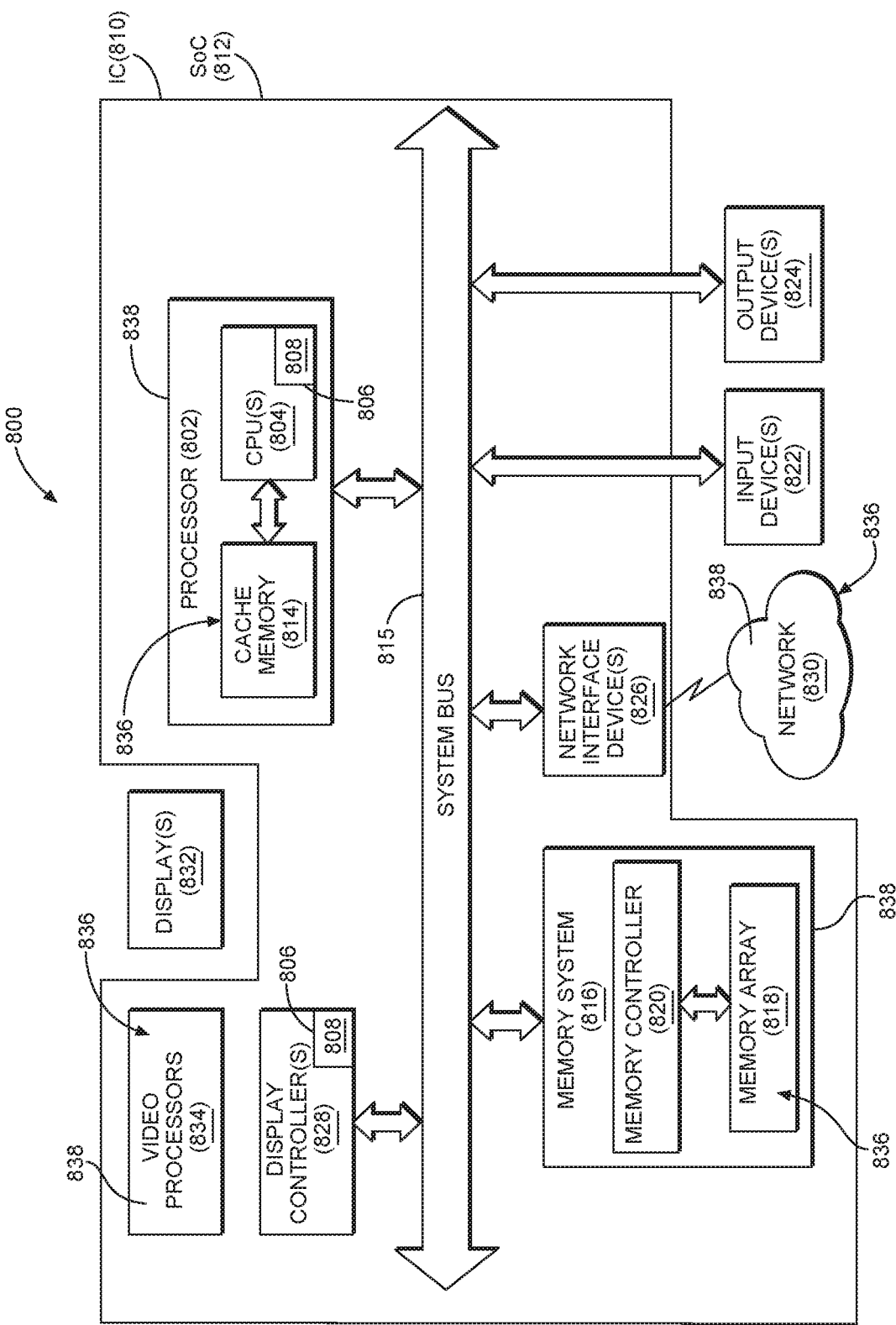
FIG. 8 illustrates an exemplary processor-based system which may include the CPU circuit and GPU circuit of FIG. 2A or 2B to provide rendered drawings to a display with the power saving techniques of the present disclosure.

In this regard, FIG. 8 illustrates an example of a processor-based system 800 that may implement exemplary aspects of the power saving techniques of the present disclosure. In particular, the processor-based system 800 can include a processor 802 that includes one or more CPUs 804 that each include one or more instruction-processing circuits 806. The processor 802 may correspond to the application processor 200 of FIG. 3 and may potentially include the GPU circuit 209 of FIG. 3. Each instruction-processing circuit 806 can include a scheduler circuit 808.

In this example, the processor-based system 800 is provided in an IC 810. The IC 810 may be included in or provided as a system on a chip (SoC) 812. The processor 802 may include a cache memory 814 coupled to the CPU(s) 804 for rapid access to temporarily stored data. The processor 802 is coupled to a system bus 815 and can intercouple master and slave devices included in the processor-based system 800. As is well known, the processor 802 communicates with these other devices by exchanging address, control, and data information over the system bus 815.

Although not illustrated in FIG. 8, multiple system buses 815 could be provided, wherein each system bus 815 constitutes a different fabric. For example, the processor 802 can communicate bus transaction requests to a memory system 816 as an example of a slave device. The memory system 816 may include a memory array 818 whose access is controlled by a memory controller 820.

Other master and slave devices can be connected to the system bus 815. As illustrated in FIG. 8, these devices can include the memory system 816, and one or more input devices 822. The input device(s) 822 can include any type of input device, including, but not limited to, input keys, switches, voice processors, etc. The other devices can also include one or more output devices 824, and one or more network interface devices 826 to audio, video, other visual indicators, etc. The other devices can also include one or more display controllers 828 as examples. The display controller(s) 828 can include one or more instruction-processing circuits 806 and/or a CPU circuit and/or GPU circuit that operate according to exemplary aspects of the present disclosure.

The network interface device(s) 826 can be any device(s) configured to allow exchange of data to and from a network 830. The network 830 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 826 can be configured to support any type of communications protocol desired.

The processor 802 may also be configured to access the display controller(s) 828 over the system bus 815 to control information sent to one or more displays 832. The display controller(s) 828 sends information to the display(s) 832 to be displayed via one or more video processors 834, which process the information to be displayed into a format suitable for the display(s) 832. The display controllers 828 or the video processor 834 may include the GPU circuit 209. The display(s) 832 can include any type of display, including, but not limited to, a cathode ray tube (CRT), a liquid crystal display (LCD), light emitting diode (LED) display, a plasma display, etc. and may be the display 216 of FIG. 2.

The processor-based system 800 in FIG. 8 may include a set of instructions 836 configured to control the scheduling of instructions and to insert a dummy read instruction for a produced value generated by execution of a produced instruction in one or more of the instruction pipelines that, if data-forwarded in the instruction pipeline, will not be available to be consumed by its consumer instruction. The instructions 836 may be stored in the memory array 818 of the memory system 816, the processor 802, the video processor(s) 834, and the network 830 as examples of a non-transitory computer-readable medium 838.

While the computer-readable medium 838 is shown in an exemplary embodiment to be a single medium, the term "computer-readable medium" should be taken to include a single medium or multiple media (e.g., a centralized or distributed database, and/or associated caches and servers) that store the one or more sets of instructions 836. The term "computer-readable medium" can also include any medium that is capable of storing, encoding, or carrying a set of instructions for execution by the processing device and that cause the processing device to perform any one or more of the methodologies of the embodiments disclosed herein. The term "computer-readable medium" includes, but is not limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A device comprising:
a processor comprising:
a display-bus interface configured to couple to a display bus;
a front-frame buffer communicatively coupled to the display-bus interface;
a back-frame buffer communicatively coupled to the front-frame buffer;
an instruction-processing circuit communicatively coupled to the front-frame buffer and the back-frame buffer; and
a graphics processing unit (GPU) interface coupled to the instruction-processing circuit and configured to send draw calls to a GPU circuit based on rendering commands generated by the instruction-processing circuit; and
wherein the instruction-processing circuit is further configured to:
control the front-frame buffer and the back-frame buffer and move data therebetween;
compare a second set of draw calls received from a game engine software to a first set of draw calls previously received from the game engine software to determine a difference; and
in response to the difference not exceeding a predefined threshold, send a previous frame image based on the first set of draw calls to a display through the display-bus interface,
wherein at least one parameter is selected from the group consisting of: number of draw calls in a frame, number of vertices in a frame, number of textured vertices in a frame, flush count, camera pose, frame buffer object (FBO) name, FBO size, and FBO sequence.

2. The device of claim 1, wherein the instruction-processing circuit is further configured to, responsive to the difference between the second set of draw calls and the first set of draw calls exceeding the predefined threshold for at least one parameter, send the second set of draw calls to the GPU circuit through the GPU interface.

3. The device of claim 1, further comprising a second instruction-processing circuit configured to process the game engine software.

4. The device of claim 1, wherein the display-bus interface comprises a display serial interface (DSI) bus interface.

5. The device of claim 1, wherein the instruction-processing circuit is further configured to compare different draw calls after every other draw call is received.

6. The device of claim 1, wherein the instruction-processing circuit is configured to determine if the difference exceeds the predefined threshold.

7. The device of claim 6, wherein the instruction-processing circuit configured to determine that the difference exceeds the predefined threshold so determines when the first set of draw calls is not identical to the second set of draw calls.

8. The device of claim 6, wherein the instruction-processing circuit configured to determine that the difference exceeds the predefined threshold so determines when the first set of draw calls is different by more than ten percent relative to the second set of draw calls.

9. The device of claim 6, wherein the instruction-processing circuit configured to determine that the difference exceeds the predefined threshold so determines when at least one of a plurality of parameters is different between the first set of draw calls and the second set of draw calls.

10. The device of claim 1, wherein the instruction-processing circuit is further configured to compare different draw calls after every third draw call is received.

11. The device of claim 1, wherein the instruction-processing circuit is further configured to receive the first set of draw calls from the game engine software.

12. The device of claim 1, wherein the instruction-processing circuit is further configured to swap contents of the front-frame buffer with contents of the back-frame buffer.

13. The device of claim 1 wherein the processor comprises a system on a chip (SoC).

14. The device of claim 1 comprising an apparatus selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone;
a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A method of controlling a processor, comprising:
receiving a first set of draw calls from a game engine software;
subsequently receiving a second set of draw calls from the game engine software;
sending the first set of draw calls to a graphics processing unit (GPU) circuit; and
not sending the second set of draw calls to the GPU circuit when a difference between the first set of draw calls and the second set of draw calls is less than a predefined threshold,
wherein the predefined threshold is based on at least one parameter selected from the group consisting of: number of draw calls in a frame, number of vertices in a frame, number of textured vertices in a frame, flush count, camera pose, frame buffer object (FBO) name, FBO size, and FBO sequence.

16. The method of claim 15, further comprising sending the second set of draw calls to the GPU circuit responsive to the difference between the second set of draw calls and the first set of drawings calls exceeding the predefined threshold for at least one parameter.

17. The method of claim 15, further comprising generating the first set of draw calls with game engine software associated with a second instruction-processing circuit.

18. The method of claim 15, further comprising sending a rendered frame to a display based on an output from the GPU circuit.

19. The method of claim 15, further comprising comparing different draw calls after every other draw call is received.

20. The method of claim 15, wherein not sending occurs only when there is no difference between the first set of draw calls and the second set of draw calls.

21. The method of claim 15, wherein not sending occurs when the difference is less than ten percent for one parameter.

22. The method of claim 15, further comprising receiving a rendered frame from the GPU circuit responsive to sending the first set of draw calls to the GPU circuit.

23. The method of claim 22, further comprising storing the rendered frame in a back-frame buffer.

24. The method of claim 23, further comprising swapping contents of the back-frame buffer with contents of a front-frame buffer.

\* \* \* \* \*